United States Patent [19]

Stevenson et al.

[11] Patent Number: 4,689,767
[45] Date of Patent: Aug. 25, 1987

[54] MAGNETIC TAPE DRIVE CONTROLLER UTILIZING DUAL DMA CONTROLLERS

[75] Inventors: Alexander J. Stevenson, Framingham; David M. Lounsbury, Boston, both of Mass.

[73] Assignee: Prime Computer Inc., Natick, Mass.

[21] Appl. No.: 790,631

[22] Filed: Oct. 22, 1985

Related U.S. Application Data

[63] Continuation of Ser. No. 466,220, Feb. 14, 1983, abandoned.

[51] Int. Cl.⁴ .......................... G06F 7/24; G06F 13/38
[52] U.S. Cl. ........................................ 364/900; 360/39
[58] Field of Search ... 364/200 MS File, 900 MS File, 364/200, 900; 360/48, 49, 53, 54, 39

[56] References Cited

U.S. PATENT DOCUMENTS

| | | | |
|---|---|---|---|
| 4,034,349 | 7/1977 | Monaco et al. | 364/200 |
| 4,067,059 | 1/1978 | Derchak | 364/200 |
| 4,380,029 | 4/1983 | Bode | 360/48 |
| 4,387,424 | 6/1983 | Frediani et al. | 364/200 |
| 4,393,445 | 7/1983 | Milligan et al. | 364/200 |
| 4,500,965 | 2/1985 | Gray | 364/900 X |

OTHER PUBLICATIONS

"8237/8237 High Performance Programmable DMA Controller", MCS/80/85 Family User's Manual, Oct. 1979.
Hillman DL, "Intelligent Buffer Reconciles Fast Processors and Slow Peripherals", Electronics, 9-11-1980, pp. 131-135.

*Primary Examiner*—Archie E. Williams, Jr.
*Assistant Examiner*—David L. Clark
*Attorney, Agent, or Firm*—Wolf, Greenfield & Sacks

[57] ABSTRACT

A controller for use with a magnetic tape drive which has a plurality of buffer memories for temporarily storing data that is passed between the tape drive and a host computer system. Temporary storage of data within the tape controller allows data to be rewritten on the tape if the initial writing is faulty and allows data read from the tape to be reconstructed if the data has been erroneously recorded.

Transfer of information into and out of the buffer circuits is controlled by two independent direct memory access circuits—one circuit transfers data between the host computer system and the buffer memories and the other circuit transfer data between the buffer memories and the tape drive. Each of the direct memory access circuits operates independently of the other, however, both circuits are coordinated by a central processing unit which communicates with the direct memory access units by means of an interrupt arrangement.

The controller also contains a serial input/output unit which allows the controller to format and decode a data format that allows synchronous decoding of the data which in turn permits "on the fly" error correction.

15 Claims, 2 Drawing Figures

MAGNETIC TAPE DRIVE CONTROLLER UTILIZING DUAL DMA CONTROLLERS

This application is a continuation of application Ser. No. 466,220, filed Feb. 14, 1983, now abandoned.

FIELD OF THE INVENTION

This invention relates to circuitry for storing digital data and, in particular, to circuitry which permits a host computer system to control a magnetic tape drive.

BACKGROUND OF THE INVENTION

Present day computer systems store digital data in a variety of storage devices including magnetic tape drives, magnetic disk drives and semiconductor memories. To permit the computer system, which is usually called the "host" system, to operate these storage devices, an interface circuit called a controller is connected between the storage device and the computer. The controller receives coded commands from the host system and translates these commands into the various signals which are needed to physically operated the storage device to allow it to store and retrieve data. In order to relieve the host computer from as much of the routine "bookkeeping" tasks as possible, the controller circuit may also perform format conversion by converting the data from the form in which it is stored in the storage device into a form which is used in the computer. Some controller circuits also perform error detection and correction.

The functions performed by the controller circuitry obviously vary depending on the class of storage device to which it is connected. For example, data to be stored must often be converted between the parallel form used internally in the computer and the serial form used in some magnetic tape drives and disk storage units. Even if the controller is to operate with a single class of storage device, the operation of the controller is so intimately associated with the operation of the associated device that the functions and operation of the controller circuitry may depend on the particular characteristics of the device. For example, there are several different types of magnetic tape drives in present use.

One conventional magnetic tape drive called in "start/stop" drive utilizes motor-driven capstans and pinch rollers to maintain a constant tape speed. The motor drives which run the capstans are often controlled by sophisticated servomechanisms and can quickly accelerate and decelerate the tape so that it can be brought to any desired location.

Another type of magnetic tape drive which is commonly used is called a "bit streaming" drive. With this type of drive there is no servomechanism, rather the tape is moved by a less precisely controlled motor. Bit streaming systems, although much less expensive than start/stop servo-controlled drives, have the characteristic that the tape cannot be speeded up quickly to its operating speed nor can it be decelerated quickly to a stop. Therefore, when data is to be written or read from the units the tape must be gradually accelerated to operating speed, the data written and then the tape allowed to coast to a stop. Typically, the accelerating and decelerating portions of the writing cycle are of such length that several blocks or pieces of data may pass by the reading or writing head before the system is running at a stable speed and is ready to operate.

It is desirable to have one controller circuit which can operate with both start/stop drives and bit streaming drives. However, a controller circuit which is to operate with both of these types of tape drives must be able to accomodate the differences in operation. Most prior art tape controllers have not been able to operate satisfactorily with both start/stop drives and bit streaming drives because conventional tape controllers have been unable to perform error correction while the tape is moving ("on-the-fly" error correction). In start/stop drives the tape can be positioned accurately to correct errors, but in bit streaming devices it is often impossible to stop the tape to correct errors because by the time the tape coasts to a stop, the portion of the tape which contains the errors is usually several blocks past the read and write head area. Therefore with bit streaming tape drives error correction had to be performed by the computer itself causing a large amount of processing time to be devoted to error correction.

It is therefore an object of the present invention to provide a tape drive controller which will operate satisfactorily with either start/stop drives or bit streaming tape drives.

It is another object of the present invention to provide a tape drive controller which can perform error correction "on-the-fly".

It is yet another object of the present invention to be able to perform "on-the-fly" error correction with both start/stop tape drives and bit streaming tape drives.

It is a further object of the present invention to provide a tape controller which does not require a large amount of software overhead in the host computer.

It is still another object of the present invention to provide a tape drive controller which can be constructed from readily available components.

SUMMARY OF THE INVENTION

The foregoing objects are achieved and the foregoing problems are solved in one illustrative embodiment of the invention in which a tape drive controller is provided with a buffer memory area which can temporarily store data retrieved from the tape or to be written to the tape. Transfer of the information between the buffer area and the host computer is controlled by a direct memory access unit and information transfer between the buffer area and the tape drive is controlled by a separate direct memory access unit. The operation of the direct memory access units is coordinated by a dedicated microprocessor so that information transfer into the buffer area overlaps information transfer out of the buffer area to provide efficient movement of the information through the controller.

The microprocessor also controls a serial input/output controller which provides parallel-to-serial conversion and data formatting in a synchronous coding scheme which permits the digital data to be broken into small blockettes, several of which can be temporarily stored in the buffer area. If an error occurs during data writing in a blockette, that blockette is rewritten. A unique blockette numbering scheme allows the temporarily stored blockettes to be reassambled in the proper order during a subsequent reading operation so that error correction can be performed "on the fly".

DETAILED DESCRIPTION OF THE PREFERRED EMBODIMENT

Figure 1:
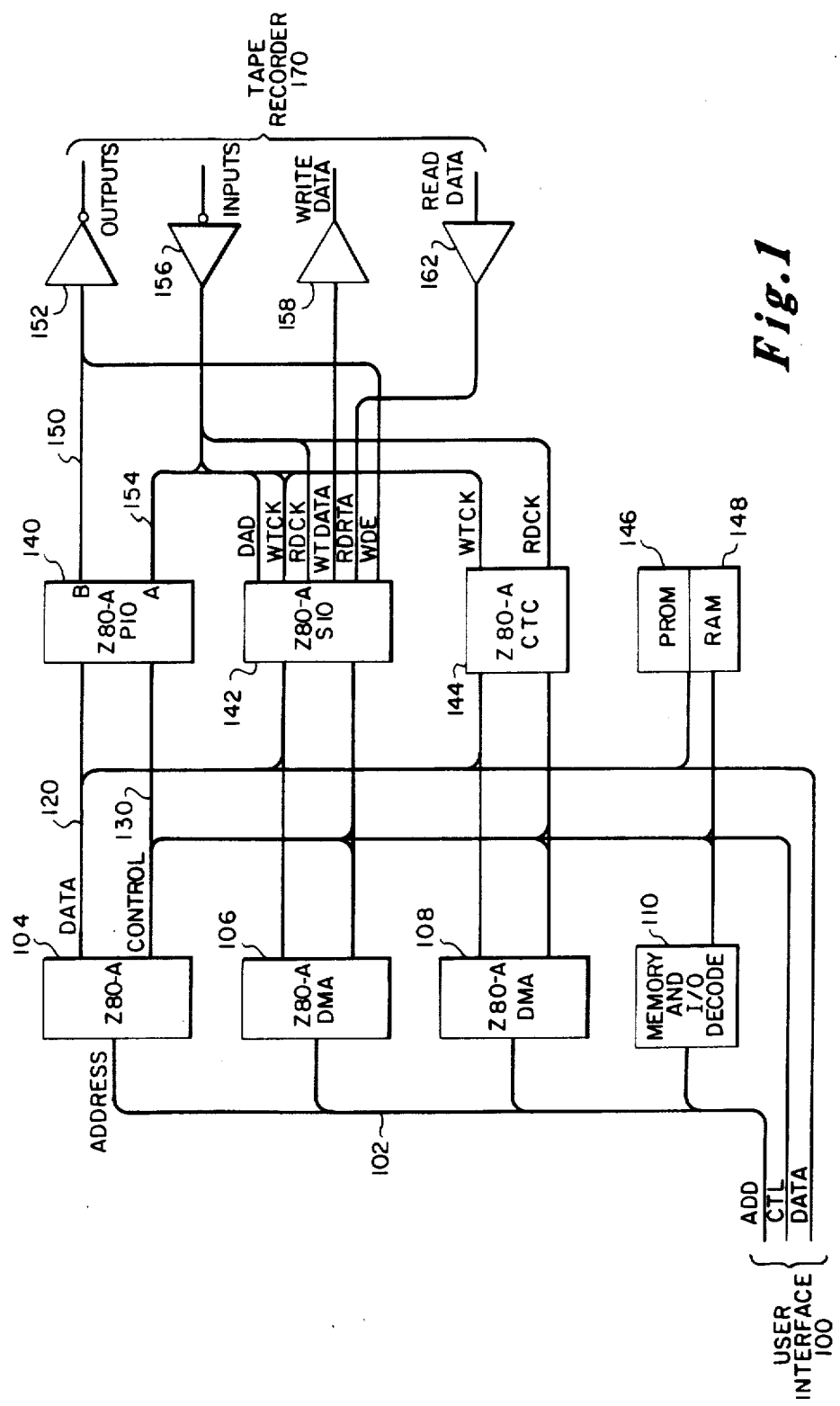
FIG. 1 shows a block schematic diagram of the illustrative tape controller.

FIG. 1 shows a block schematic diagram of the invention tape controller which is inserted between a host computer system and a magnetic tape drive which might be of the start/stop type or of the bit streaming type. The details of the computer system and of the tape drive form no part of the present invention and therefore will not be discussed further herein.

The controller circuitry connects to the host computer system by means of user interface 100 and to the tape drive by means of interface 170. User interface 100 is usually connected to a computer through a peripheral or input/output bus and associated bus interface circuitry. This circuitry is conventional and is not shown for clarity.

The host computer provides commands in the form of data (over the data bus 120) which commands are processed and converted by the controller's microprocessor to produce data, address and control signals suitable for operating the controller and controlling the tape drive. Although address bus 102 is shown in FIG. 1 as a single line, it actually consists of multiple wires, each of which carries a single signal. The number of wires in the bus depends on the particular microprocessor configuration used. In the illustrative embodiment, the address bus has sixteen lines. Similarly, the control bus consists of seven multiple lines. Data to be stored on the tape or data retrieved from the tape passes between the controller and the host computer by means of data bus 120 which, illustratively, has eight multiple lines.

Interface 170 is also conventional and allows transfer of data and control information from the controller circuitry to the associated tape drive. Read data passing from the tape drive to the controller circuitry is transferred through receiver 162. Similarly, write data passing from the controller to the tape drive is transferrred through driver 158. Control signals passing between the tape drive and the controller pass through receivers 156 and driver 152, respectively. Drivers/receivers 152-162 are conventional signal drivers/receivers.

In accordance with one aspect of the invention, the data passing between the host computer and the tape drive is not transmitted directly through the controller. Instead the data is temporarily stored in an internal buffer memory. To achieve efficient data flow through the controller circuitry, data transfers to and from the memory are controlled by separate direct memory access circuits operating independently but coordinated by the central processing unit.

More particularly, data passing through the controller is temporarily stored in internal random access memory 148. The size of this memory depends on the amount of data which must be stored to achieve error detection and correction but typically only a few Kbytes would be necessary. A memory suitable for use with the illustrative embodiment is a 4 Kbyte semiconductor random access memory (RAM) manufactured by the Hitachi Corporation part number HM6116 (this part is a 2 Kbyte RAM two are used).

Control of data flow from user interface 100 to RAM 148 is accomplished by direct memory access (DMA) unit 106. DMA unit 106 is well-known circuit which generates control and gating signals to transfer information from a memory to a designated port. The DMA circuitry is such that, after an initial selection and enabling by the central processing unit, no further intervention by the CPU is necessary to effect the transfer. In particular DMA circuitry 106, upon being selected by the central processing unit, reads data from interface 100 and transfers the data to memory 148. The operation of a DMA circuit in this manner is well-known. A direct memory access unit suitable for use with the illustrative embodiment is a Z80 Direct Memory Access Controller, Model Z8410, manufactured by Zilog, Inc., 10340 Bubb Road, Cupertino, Calif. 95014. The operation and use of the Zilog Z8410 unit is explained in detail in the Data Book for Z80 devices published by Zilog, Inc.

From RAM 148 information can be transferred over data bus 120 to serial input/output (SIO) controller 142 and from there to the tape drive, via interface 170, as will be hereinafter described. Specifically, transfers from memory 148 over data bus 120 to SIO unit 142 are controlled by DMA unit 108 which may illustratively be the same as DMA unit 106.

The operation of DMA units 106 and 108 is in turn coordinated by central processing unit (CPU) 104 which may be any suitable microprocessor unit with sufficient speed for implementing the error correction algorithms. Processor 104 which may illustratively be a Z80-A Central Processing Unit, Model Z8400, manufactured by Zilog, Inc. Processor 104 coordinates the operation of all units, including the memory 148, in the controller circuitry either enabling or disabling the units by asserting of negating signals provided to the units' chip select (CS) inputs or chip enable (CE) inputs. The enabling signals are generated by memory and I/O decode circuit 110. This circuit receives selected address signals (address bits 2-7) from CPU 104 over address bus 102, decodes the signals and generates the appropriate enabling signal.

In accordance with the invention, the operation of DMA controllers 106 and 108 is independent in that both controllers may simultaneously be running transfer cycles. Since there is only one common data bus, however, physically only one transfer either into or out of memory 148 can take place at any time. The DMA units are constructed to take control of the system address and data buses during a transfer so that they can properly allocate the transfer time between them without intervention from the central processing unit. The units operate concurrently with CPU 104 by cycle-stealing memory and I/O read/write cycles in a well-known manner.

The use of two DMA controllers allows overlap in the transfer of information between user interface 100 and the tape drive interface 170. In particular, under control of DMA unit 106, a blockette of information can be transferred from user interface 100 to memory 148. Processor 104 then signals DMA unit 108 to begin transfer of that blockette of information to the serial input/output unit 142. At the same time microprocessor 104 signals DMA 106 to start the transfer of a new blockette of data into a different location in memory 148. Thus, as information is being transferred out of memory 148 information is also being transferred into memory 148. Accordingly, memory 148 may be configured as a plurality of buffer locations.

Also associated with memory 148 is a programmable read only memory (PROM) 146 which contains the operating software for the processor 104. This memory can also be enabled by memory and I/O decode circuit 110. For the illustrative controller, memory 146 can be approximately 4 Kbytes in size.

Information to be transferred from memory 148 to the tape drive interface 170 is first sent to serial input/output unit (SIO) 142. This is a well-known circuit device which is conventionally used with synchronous data communication channels. A unit suitable for use in the illustrative embodiment is Z80 Serial Input/Output Controller Model Z8440/2 manufactured by Zilog, Inc. The operation and programming of this unit is set forth in detail in the data book for the SIO unit published by Zilog, Inc.

In the illustrative embodiment, SIO unit 142 functions to detect data coming into the controller from the tape drive, provide serial-to-parallel and parallel-to-serial conversion between the parallel data on the data bus 120 and the serial data coming from the tape, provide formatting of the data, and error checking.

Figure 2:
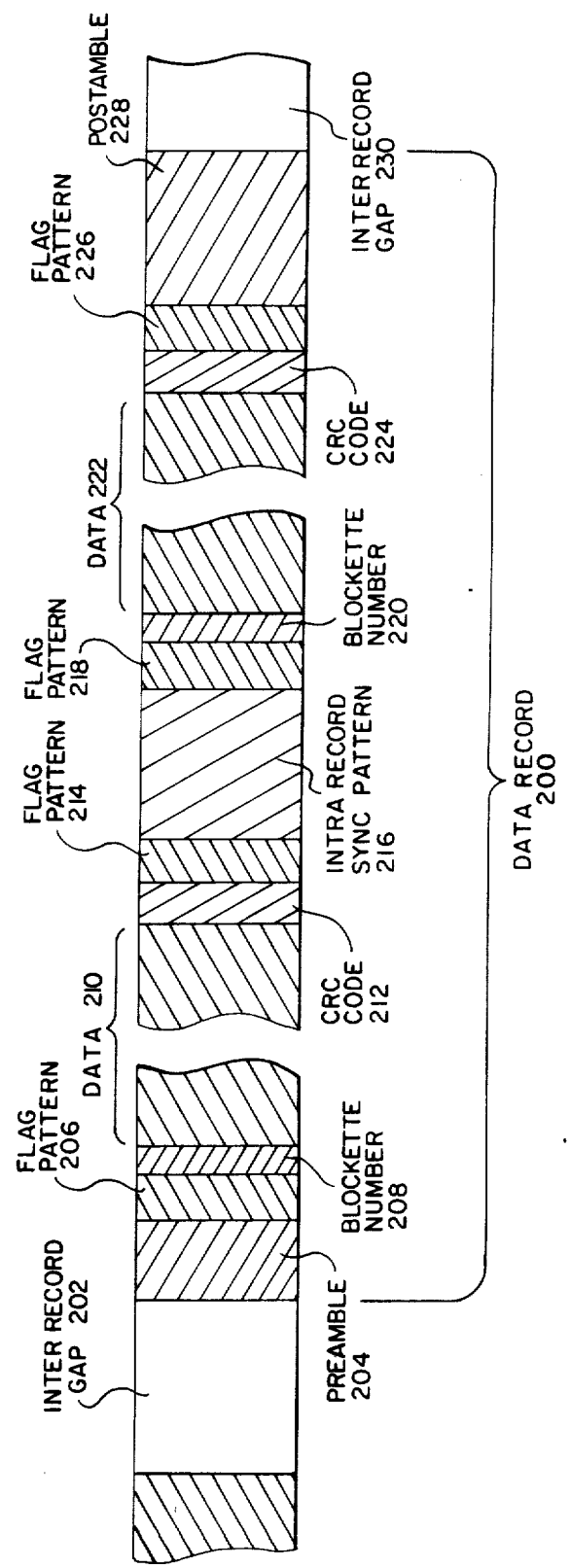
FIG. 2 is a diagram of the error correcting format used with the present invention.

In accordance with another aspect of the invention, SIO unit 142 may be programmed to format data passing through the controller in a synchronous byte-oriented format which provides for easy error detection and correction of errors "on-the-fly". A illustrative example of such a data format is shown in FIG. 2. Since the SIO unit is capable of performing the formatting operations without intervention by the CPU, the amount of software overhead necessary for implementing this data format is minimal.

FIG. 2 shows the arrangement of a data which might be found in one track of the magnetic tape which is to be used with the illustrative tape controller. The data is arranged in a well-known manner in records of which record 200 is an example. Record 200 is separated from other records on the tape track by interrecord gaps 202 and 230. These gaps are completely erased and contain no digital data information.

The division of the data into records separated by blank gaps is a conventional method of arranging data on magnetic tape. However, the SIO circuit of the present invention is capable of arranging or formatting the data within each record to provide for easy error detection and correction when used with the inventive controller having an internal buffer memory.

Specifically, each record begins with a preamble 204. The exact nature of this preamble is dependent on the type of reading circuitry which is used to retrieve information from the tape. The preamble usually consists of a repetitive pattern of digital bits which are used by a phase-locked loop or other similar circuitry in the reading mechanism synchronized with the data on the tape. A preamble suitable for use with the illustrative consists of forty (five bytes) binary "0"s.

The preamble is followed by a flag pattern 206. As with the preamble, this pattern consists of a unique code which prepares the reading circuitry to read the control information and data following flag pattern 206. Flag pattern 206 normally consists of a code which is unique and cannot be found in the data so that it will not be confused with data.

A typical flag code is the pattern "01111110". This is a unique code which cannot be found in normal data patterns due to a well-known process known as "bit stuffing" in synchronous communications. When data is written using this process, the writing circuitry which generates the preamble, flag and data encoding patterns automatically inserts an extra binary "0" after each group of five consecutive binary "1"s in the blockette number fields (208, 220), the data fields (210, 222) and the CRC fields (212, 224). When bit-stuffed code produced by writing circuitry of this type is read the reading circuitry automatically removes the "0" following a group of five consecutive binary "1"s thereby ensuring that the data pattern, as read, corresponds to the data pattern as written. The presence of the inserted bits however, ensures that the reading circuitry will recognize a code of more than five consecutive "1"s as a special code. The circuitry recognizes six consecutive "1"s as a flag code.

Flag pattern 206 typically consists of three consecutive bytes of the flag code discussed above and is detected by the reading circuitry to prepare the circuitry for receiving the blockette number 208 which follows.

In order to allow error correction on-the-fly each data record is broken into one or more "blockettes". As shown in FIG. 2, data record 200 consists of only two "blockettes" but as many as 128 can be used in the illustrative embodiment. Each blockette contains an identifying number which identifies the position of the blockette relative to other blockette within the data record and its presence means that the blockettes need not be written in consecutive order, since the blockettes can be assembled in the correct order after reading. The blockette numbers start with one and increase consecutively for each blockette within the data record. The blockette number allows error correction to be done on-the-fly in accordance with the error correcting method and apparatus disclosed in our copending application Ser. No. 466,333 entitled, "Digital Data Error Correction Apparatus" filed on Feb. 14, 1983 and assigned to the same Assignee as the present invention, which application is hereby incorporated by reference.

Following blockette number 208 is the data 210 contained in the first blockette of data record 200. Data 210 may consist of between 1 and 256 bytes of data. In accordance with conventional practice the data in the illustrative embodiment is written with the most significant bit first relative to the tape motion.

Following the data is a CRC check code 212. This is a two byte error correcting code which is generated by well-known circuitry in SIO 142 in accordance with conventional techniques. Following the CRC check code 212 is an additional flag pattern 214 which may be the same as flag pattern 206. Flag pattern 214 is used to signal the end of the data and constitutes the end of the first blockette.

Between blockettes there is an intrarecord synchronization pattern 216 which may consist of the same 40 bit pattern of "0"s as preamble 204. The intrarecord synchronization pattern is used to resynchronize the reading circuitry so that it can begin reading the second blockette.

Following the intrarecord synchronization pattern 216 is an additional flag pattern 218 which may be the same as flag patterns 206 and 214. This additional flag pattern signifies that the blockette number 220 is to follow. Following blockette 220 is the second section of data 222 which again may be between 1 and 256 bytes in length.

A conventional CRC check code 224 follows data 222 as in the first blockette. A final flag pattern 226 is provided to signify the end of the data and a postamble 228 is added to complete data record 200. Postamble 228 is the same as preamble 204 in that it consists of forty "0"s. Postamble 228 allows the record to be read in the reverse direction. Following record 200 is an additional interrecord gap 230 which separates it from a following record.

SIO unit 142 formats the data as specified above by generating the synchronization field, framing the data and generating and checking the CRC code. It also performs bit stuffing in the blockette number, data and CRC fields as discussed above. SIO 142 also detects data errors (dropouts) by monitoring the data detect signal (DAD signal) and controls the write head for writing data by generating a write enable signal (WDE signal). These operations are performed by programming the SIO unit in a conventional manner as set forth in the above-referenced data book which explains the operation of the SIO unit. Data is synchronously clocked into and out of the SIO by read and write clock signals (RDCK and WTCK) sent from the tape drive over interface 170.

As explained in detail in the above-identified copending application entitled, "Digital Data Error Correcting Apparatus", the use of blockettes and blockette numbers allows portions of a data record to be rewritten at following locations on the tape if there is an error during writing. When the blockettes are later read by the inventive controller apparatus they are temporarily stored in buffer memory 148. Subsequently the blockettes are read out of memory 148 in the order specified by the blockette numbers, thereby reconstructing the original data even in the presence of errors.

Also included in the illustrative controller circuitry is a parallel input/output controller (PIO) 140. This is a conventional unit, which may illustratively be a Z80 Parallel Input/Output Controller, Model Z8420, manufactured by the Zilog Corporation. This device provides an interface between the tape drive and the central processing unit 104. In operation, the input/output controller 140 receives data and commands from CPU 104 and generates address and control signals which select the tape unit and track and control the speed and direction of motion of the selected tape drive. These signals are generated in a conventional manner as explained in the data book describing the Zilog PIO published by Zilog, Inc.

In addition, PIO unit 140 senses status signals generated by the tape drive and generates interrupt signals which interrupt the operation of the CPU in a well-known manner to inform the CPU unit of certain conditions occuring in the tape drive. PIO unit also monitors end-of-frame signals generated by SIO unit 142 and end-of-data signals generated by the user.

The final piece of apparatus included in the illustrative controller circuitry is a counter timer circuit (CTC) 144. This circuit is also a well-known circuit device which generates timing and control signals under control of CPU 104. A device suitable for use with the illustrative embodiment is a Z80 Counter Timer Circuit, Model Z8430, manufactured by the Zilog Corporation. CTC unit 144 contains four counters and timers that can be programmed by the CTC unit 104 to provide counting and timing operations such as counting read and write strobes and providing a real-time clock for operation of the controller. In operation, CTC 144 receives a start signal from CPU 104 and counts down to a predetermined number. At this point it generates an interrupt which indicates to the CPU 104 that a predetermined time limit has been reached. CTC 144 then automatically reloads a predetermined "time constant" and resumes counting down again. The unit is used to eliminate extra software which would be necessary to provide timing operations.

What is claimed is:

1. A magnetic tape drive controller for transferring blocks of digital data between a magnetic tape drive and a host computer system, said controller receiving said blocks from one of said tape drive or said computer system in a first order, storing said blocks and transmitting said blocks in a second order to the other of said tape drive or said computer system, said controller comprising
    an interface circuit for transmitting data and control information between said host computer system and said controller,
    a buffer memory for temporarily storing data blocks being transferred by said controller between said computer system and said tape drive,
    a central processing unit connected to said interface circuit and responsive to data information transmitted between said host computer system and said interface circuit for generating CPU control signals and for generating CPU address signals uniquely specifying each of the data blocks stored in said memory,
    a first direct memory access circuit responsive to said CPU control and CPU address signals for starting a transfer of a first data block between said interface circuit and said memory, said first direct memory access circuit operating thereafter independently without further intervention by said central processing unit and producing DMA control and DMA address signals to complete the transfer of the entire first data block between said interface and said memory, and
    a second direct memory access circuit responsive to said CPU control and CPU address signals for starting the transfer of a second data block between said memory and said tape drive, said second direct memory access circuit operating thereafter independently without further intervention by said central processing unit and producing DMA control and DMA address signals to control transfer of the entire second data block between said memory and said tape drive.

2. Controller apparatus for transferring digital data between a magnetic tape drive and a host computer system according to claim 1 wherein said central processing unit generates control signals to control said first direct memory access circuit and said second direct memory access circuit to operate transfer cycles concurrently.

3. Controller apparatus for transferring digital data between a magnetic tape drive and a host computer system, according to claim 2 further comprising means connected between said buffer memory and said tape drive and responsive to said control signals for encoding data being written on magnetic tape by said tape drive in a serial format wherein said data is preceded by a coded synchronization pattern.

4. Controller apparatus for transferring digital data between a magnetic tape drive and a host computer system, according to claim 3 wherein said means for encoding data being written on magnetic tape generates an error correcting code based on said data which error correcting code is written on said tape at the end of said data.

5. Controller apparatus for transferring digital data between a magnetic tape drive and a host computer system, according to claim 3 wherein said means for encoding data being written on magnetic tape is enabled by said control signals and thereafter operates independently from said central processing unit.

6. Magnetic tape drive controller apparatus for transferring digital data between a magnetic tape drive and a host computer system, said data being received from said tape drive as a plurality of data blocks, a portion of the data in each block constituting a block number which uniquely identifies the block in relation to other blocks, said controller apparatus comprising, an interface circuit for transferring data information between said host computer system and said tape drive controller, a controller memory for storing data blocks received from said tape drive, means, including a first direct memory access circuit, for receiving data blocks from said tape drive and for transferring the information in each of said data blocks to said controller memory in the order that the blocks are received from said tape drive, processor means connected to said controller memory for reading the block numbers of data blocks stored in said controller memory and for generating first address and control signals specifying data blocks in sequential order of the block numbers, and a second direct memory access circuit responsive to said first address and control signals for transferring the specified data blocks from said controller memory to said interface circuit for transmission to said host computer system.

7. Controller apparatus according to claim 6 wherein said interface circuit is connected between said host computer system, said processor means and said second direct memory access circuit for transferring command information from said host computer system to said processor means, said processor means being responsive to said command information for generating second address and control signals, said second direct memory access circuit being responsive to said second address and control signals for transferring blocks of data from said host computer system through said interface circuit to said controller memory.

8. Controller apparatus according to claim 7 further comprising means responsive to data received from said host computer system and stored in said memory for dividing each of said stored blocks into a plurality of blockettes as said stored blocks are transferred from said memory to said tape drive, means for generating a set of identifying number codes representing a sequential set of blockette numbers, said generating means being responsive to said command information for generating third address and control signals, said first direct memory access circuit being responsive to said third address and control signals for alternately transferring blockettes and one of said generated number codes to said tape drive.

9. Controller apparatus according to claim 8 further comprising means responsive to said third address and control signals for encoding data blockettes as said blockettes are transferred from said controller to said tape drive in a serial format wherein the data in each of said data blockettes is preceded by a coded synchronization pattern.

10. Controller apparatus for transferring digital data between a magnetic tape drive and a host computer system, according to claim 9 wherein said means for encoding data to be written on magnetic tape generates an error correcting code based on said data in each of said blockettes, which error correcting code is written on said tape immediately following the data on which said error correcting code is based.

11. Controller apparatus for transferring digital data between a magnetic tape drive and a host computer system, according to claim 10 wherein said means for encoding data to be written on magnetic tape inserts said identifying number code immediately following said coded synchronization pattern in each blockette.

12. Controller apparatus for transferring digital data between a magnetic tape drive and a host computer system, according to claim 11 wherein said second direct memory access circuit means is responsive to said second address and control signals generated by said generating means for starting the transfer of information between said host computer system and said controller memory, said second direct memory access circuit transferring information between said host computer system and said controller memory thereafter independently without further intervention by said generating means.

13. Controller apparatus for transferring digital data between a magnetic tape drive and a host computer system, according to claim 12 wherein said first direct memory access circuit is responsive to a fourth set of control and address signals generated by said generating means for starting the transfer of information between said controller memory and said tape drive, said first direct memory access circuit transferring information between said controller memory and said tape drive thereafter independently of said generating means.

14. Controller apparatus for transferring digital data between a magnetic tape drive and a host computer system, according to claim 13 wherein said generating means generates address and control signals to control said first direct memory access circuit and said second direct memory access circuit to operate transfer cycles concurrently.

15. Controller apparatus for transferring digital data between a magnetic tape drive and a host computer system, according to claim 14 wherein said means responsive to said third address and control signals for encoding the data in each of said blockettes comprises a serial input/output controller.

* * * * *